US012776989B2

(12) United States Patent
Yang et al.

(10) Patent No.: US 12,776,989 B2
(45) Date of Patent: Oct. 27, 2026

(54) RECEIVE SIDE SCALING (RSS) USING PROGRAMMABLE PHYSICAL NETWORK INTERFACE CONTROLLER (PNIC)

(71) Applicant: VMware LLC, Palo Alto, CA (US)

(72) Inventors: Guolin Yang, San Jose, CA (US); Ankur Kumar Sharma, Mountain View, CA (US); Wenyi Jiang, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 244 days.

(21) Appl. No.: 18/237,906

(22) Filed: Aug. 25, 2023

(65) Prior Publication Data

US 2025/0071062 A1 Feb. 27, 2025

(51) Int. Cl.
*H04L 47/125* (2022.01)
*H04L 47/50* (2022.01)

(52) U.S. Cl.
CPC ............ *H04L 47/125* (2013.01); *H04L 47/50* (2013.01)

(58) Field of Classification Search
CPC ... H04L 47/125; H04L 47/50; H04L 47/2441; H04L 47/2483; H04L 49/9047; H04L 49/70; H04L 45/38; H04L 67/1031
See application file for complete search history.

(56) References Cited

U.S. PATENT DOCUMENTS 7,701,849 B1 * 4/2010 Ma ...................... H04L 12/4625 370/235
9,882,815 B2 * 1/2018 Mehra ................. H04L 45/7453
11,086,801 B1 8/2021 Machulsky et al.
2009/0201935 A1 * 8/2009 Hass ................... G06F 9/30054 370/395.32
2014/0059111 A1 * 2/2014 Veeraiyan ............... H04L 67/10 709/201
2014/0376555 A1 * 12/2014 Choi ....................... H04L 45/66 370/395.53
2016/0308771 A1 * 10/2016 Tang ....................... H04L 49/90
2019/0280991 A1 9/2019 Singh et al.
2021/0232417 A1 7/2021 Wang et al.
2021/0377188 A1 12/2021 Ghag et al.
(Continued)

OTHER PUBLICATIONS

Extended European Search Report, European Application No. 24191201.3 dated Jan. 7, 2025, 12 pages.

*Primary Examiner* — Mohamed A Kamara
(74) *Attorney, Agent, or Firm* — King Intellectual Asset Management

(57) ABSTRACT

Example methods and systems for receive side scaling (RSS) are described. In one example, a computer system may generate and send instruction(s) to the programmable physical network interface controller (PNIC) to configure a first flow entry that associates a first packet flow with a first queue and a second flow entry that associates a second packet flow with a second queue. In response to receiving a first packet that is associated with the first packet flow, the programmable PNIC may match the first packet with the first flow entry and steer the first packet towards the first queue for processing by a first processing thread. In response to receiving a second packet that is associated with the second packet flow, the programmable PNIC may match the second packet with the second flow entry and steer the second packet towards the second queue for processing by a second processing thread.

20 Claims, 6 Drawing Sheets

(56) References Cited

U.S. PATENT DOCUMENTS

| | | | | |
|---|---|---|---|---|
| 2022/0103487 | A1* | 3/2022 | Ang | G06F 15/1735 |
| 2023/0269182 | A1* | 8/2023 | Li | H04L 45/745 |
| | | | | 370/392 |

* cited by examiner

RECEIVE SIDE SCALING (RSS) USING PROGRAMMABLE PHYSICAL NETWORK INTERFACE CONTROLLER (PNIC)

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., host). Each VM is generally provisioned with virtual resources to run a guest operating system and applications. The virtual resources may include central processing unit (CPU) resources, memory resources, storage resources, network resources, etc. In practice, it is desirable to improve packet processing performance on computer systems, such as by implementing receive side scaling (RSS) to distribute receive processing load among multiple packet processing threads.

DETAILED DESCRIPTION

Figure 1:
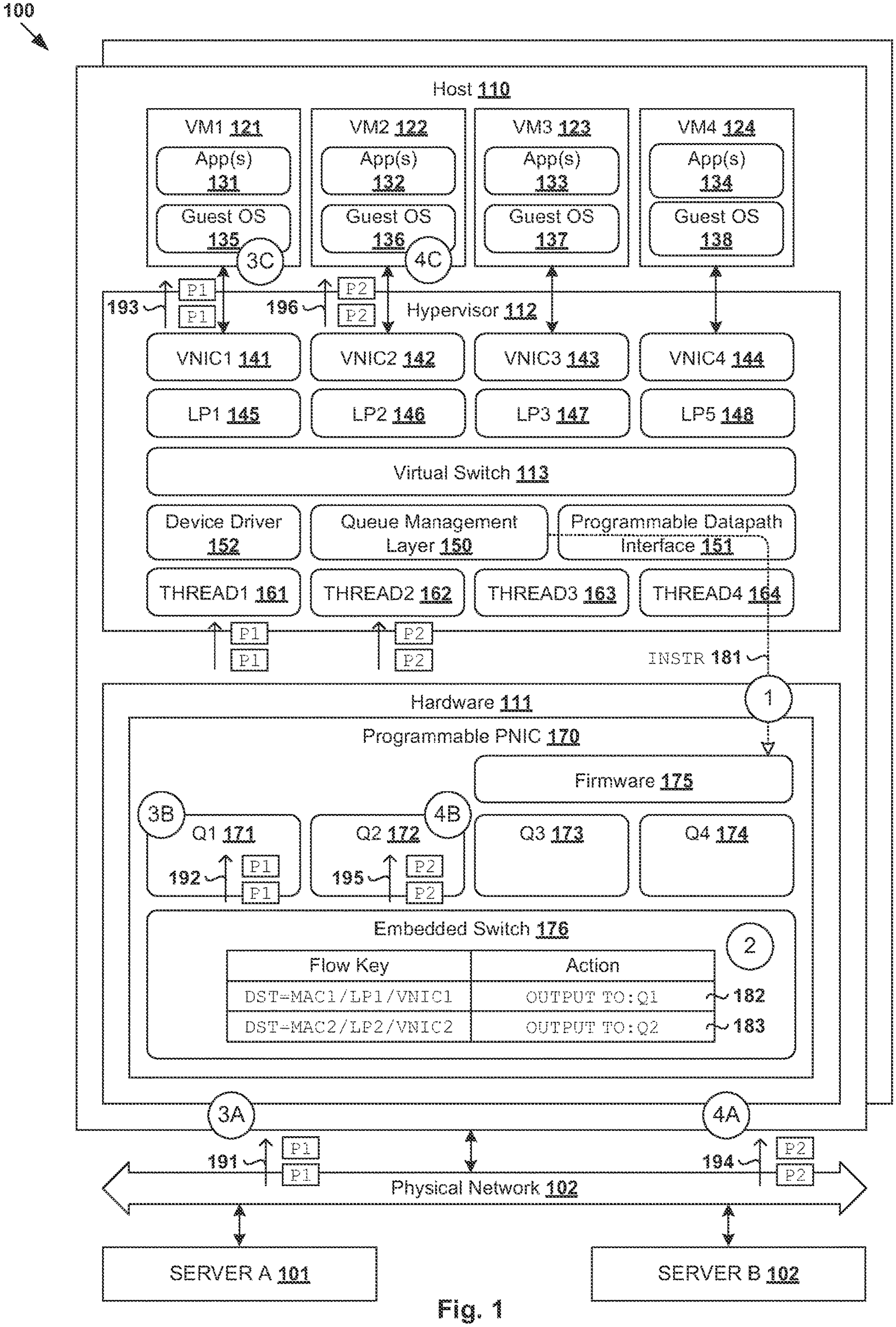
FIG. 1 is a schematic diagram illustrating an example software-defined networking (SDN) environment in which a computer system may perform receive side scaling (RSS)

According to examples of the present disclosure, receive side scaling (RSS) may be implemented to improve packet processing performance on a computer system (see host 110 in FIG. 1) that includes a programmable physical network interface controller (PNIC) and multiple processing threads. In one example, the computer system may generate and send instruction(s) to the programmable PNIC (see 170 in FIG. 1) to configure (a) a first flow entry that associates a first packet flow with a first queue and (b) a second flow entry that associates a second packet flow with a second queue. See 181-183 in FIG. 1.

In response to receiving a first packet that is associated with the first packet flow and destined for a first virtualized computing instance supported by the computer system, the programmable PNIC may match the first packet with the first flow entry and steer the first packet towards the first queue for processing by a first processing thread. See 191-193 in FIG. 1. In response to receiving a second packet that is associated with the second packet flow and destined for a second virtualized computing instance supported by the computer system, the programmable PNIC may match the second packet with the second flow entry and steer the second packet towards the second queue for processing by a second processing thread. See 194-196 in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

FIG. 1 is a schematic diagram illustrating example software-defined networking (SDN) environment 100 in which RSS may be performed using a programmable PNIC. It should be understood that, depending on the desired implementation, SDN environment 100 may include additional and/or alternative components than that shown in FIG. 1. In this example, SDN environment 100 includes multiple hosts 110 (one shown in detail for simplicity) that are connected to physical network 102. Hosts 110 may be referred to as "computer system," "host computer," "host device," "physical server," "server system," "transport nodes," etc. Each host 110 may include suitable virtualization software (e.g., hypervisor 112) and hardware 111 to support multiple virtual machines (VMs), such as VM1 121, VM2 122, VM3 123 and VM4 124. Although four VMs 121-124 are shown for simplicity, each host 100 may be supporting tens or hundreds of VMs in practice.

Hypervisor 112 may maintain a mapping between underlying hardware 111 of host 110 and virtual resources allocated to respective VMs 121-124. Hardware 111 may include any suitable physical components, such as PNIC 170, central processing unit(s) or CPU(s), memory, storage disk(s), etc. CPU(s), memory and storage disk(s) are not shown for simplicity. Virtual resources are allocated to VMs 121-124 to support respective applications 131-134 and guest operating systems (OS) 135-138, etc. For example, the virtual resources may include virtual CPU, guest physical memory (i.e., memory visible to the guest OS running in a VM), virtual disk(s), virtual network interface controller (VNIC), etc. Hypervisor 112 may implement any suitable virtualization technology, such as VMware ESX© or ESXi™ (available from VMware, Inc.), Kernel-based Virtual Machine (KVM), etc.

Hypervisor 112 may implement virtual machine monitors (VMMs) to emulate hardware resources for VMs 121-124. For example, VNICs 141-144 (denoted as "VNIC1" to "VNIC4") may be emulated to provide network access for respective VMs 121-124. In practice, VMMs (not shown for simplicity) may be considered as components that are part of respective VMs 121-124, or alternatively, separated from VMs 121-124. In both cases, VMMs may each maintain the state of respective VNICs 141-144 to facilitate migration of respective VMs 121-124. Although one-to-one relationships are shown, one VM may be associated with multiple VNICs (each VNIC having its own network address). Hypervisor 112 may be implemented any suitable virtualization technology, such as VMware ESX© or ESXi™ (available from VMware, Inc.), Kernel-based Virtual Machine (KVM), etc.

As used herein, the term "hypervisor" may refer generally to a software layer or component that supports the execution of multiple virtualized computing instances, including system-level software in guest VMs that supports namespace containers such as Docker, etc. Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

Hypervisor 112 further implements virtual switch 113 to handle traffic forwarding to and from VMs 121-124. For example, VMs 121-124 may send egress (i.e., outgoing) packets and receive ingress packets (i.e., incoming) via respective VNICs 141-144 and logical ports 145-148 during a communication session with another node (e.g., virtual machine, physical host, etc.) connected via physical network 102. In this case, VMs 121-124 may each act as an endpoint of a bi-directional inter-process communication flow with another endpoint. For example, an endpoint may be capable of creating a socket to facilitate the communication flow, such as Transmission Control Protocol (TCP) sockets, raw Internet Protocol (IP) sockets, etc. The destination node may be an external host, virtual machine supported by the external host, etc.

As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 113. However, the mapping may change in some scenarios, such as when the logical port is mapped to a different virtual port on a different virtual switch after migration of the corresponding virtualized computing instance (e.g., when the source and destination hosts do not have a distributed virtual switch spanning them). As used herein, the term "packet" may refer generally to a group of bits that can be transported together from a source to a destination, such as "segment," "frame," "message," "datagram," etc. Physical network 102 may be any suitable network, such as wide area network, virtual private network (VPN), etc.

Receive Side Scaling (RSS)

According to examples of the present disclosure, RSS may be implemented using programmable PNIC 170 to improve packet processing performance. In practice, the term "receive side scaling" (i.e., RSS) may refer generally to technique(s) for distributing incoming or ingress packets across multiple queues and processing threads to leverage parallelism during receive side processing. The term "programmable PNIC" may refer generally to a PNIC that includes programmable or configurable datapath(s). Here, the term "datapath" may refer generally to a packet forwarding path on the PNIC via which packets are steered, such as to steer the packets towards a particular queue.

Examples of the present disclosures should be contrasted against conventional RSS approaches that necessitate hardware/driver support from PNIC vendors. For example, NetQ or NetQ RSS is a software-implemented approach performed by hypervisor 112 (e.g., using vmkernel) on host 110 for steering incoming packets towards multiple queues on a PNIC. In practice, NetQ RSS requires both hardware and driver support from PNIC vendors, which may not be available in some cases. This may in turn delay production and/or adoption of RSS, which is undesirable. By configuring programmable PNIC 170 to perform RSS, examples of the present disclosures do not necessitate hardware/driver support from PNIC vendors.

Examples of the present disclosures should be contrasted against device RSS, which is a hardware-based approach that is implemented by a PNIC. In practice, device RSS has a number of limitations that render it undesirable for applications that require high packet rate. For example, device RSS may not provide any control over which flow is steered towards which queue. This may result in flows associated with different VMs being directed to the same queue and hence the same kernel thread or processing thread even when there are spare queues. In some scenarios, multiple kernel threads may be involved in the same receive path.

To improve performance, examples of the present disclosures may be implemented to override the device RSS behavior of hardware using software. In the example in FIG. 1, programmable PNIC 170 may be configured to implement RSS to distribute packet processing load among multiple (N) packet processing threads 161-164. Each packet processing thread may represent a software-implemented thread (e.g., kernel thread) that is executable on hypervisor 112 (or VM 121/122/123/124) to process packets received by host 110 via programmable PNIC 170. When RSS is implemented, incoming packets may be steered towards one of multiple (M) hardware queues 171-174 on programmable PNIC 170 for subsequent processing by one of multiple (N) processing threads 161-164. This way, parallelism may be leveraged to improve the overall performance of host 110.

In example in FIG. 1, programmable PNIC 170 may include any suitable components, including firmware 175 and embedded switch 176. Firmware 175 may represent software that is stored on programmable PNIC 170 to configure operations of programmable PNIC 170. Hardware that includes embedded switch 176 on programmable PNIC 170 may be configured using firmware 175 to receive and steer packets towards one of multiple (M) queues 171-174. In the following, an example scenario with N=M=4 will be discussed. In practice, any suitable N and M (e.g., M≤N) may be configured depending on the use cases. In general, the number of processing threads (i.e., N) may be adjusted based on the number of processing cores on hardware 111 of host 110. For example, THREAD1 161 may be executed by a first processing core, THREAD2 161 by a second processing core, and so on. Thread affinity of a particular queue may be configured by a thread load balancer (not shown) supported by hypervisor 112.

In practice, programmable PNICs may offer a number of advantages over traditional non-programmable PNICs. For example, programmable PNICs may be used to improve performance by providing a more granular control over how traffic is routed and handled. Programmable PNICs may be used to increase flexibility in terms of how datapaths are programmed based on the requirements of different VMs on host 110. Examples of the present disclosure may be implemented to reduce queue length and processing latency, which is especially beneficial for applications that require low latency, such as online gaming, video streaming, low latency application(s), etc. With the greater availability and adoption of programmable PNIC 170, examples of the present disclosure may facilitate faster software delivery that has limited dependency on hardware capabilities.

Some examples will be described using FIG. 2, which is a flowchart of example process 200 for a computer system to perform RSS using a programmable PNIC. Example process 200 may include one or more operations, functions, or actions illustrated by one or more blocks, such as 210 to 250. Depending on the desired implementation, various blocks may be combined into fewer blocks, divided into additional blocks, and/or eliminated. In the following, various examples will be discussed using host 110 as an example "computer system," VM1 121 and VM2 122 as example virtualized computing instances. Host 110 may perform examples of the present disclosure using any suitable software and/or hardware components, such as programmable PNIC 170, queue management layer 150, programmable datapath interface 151, device driver 152, etc.

Figure 2:
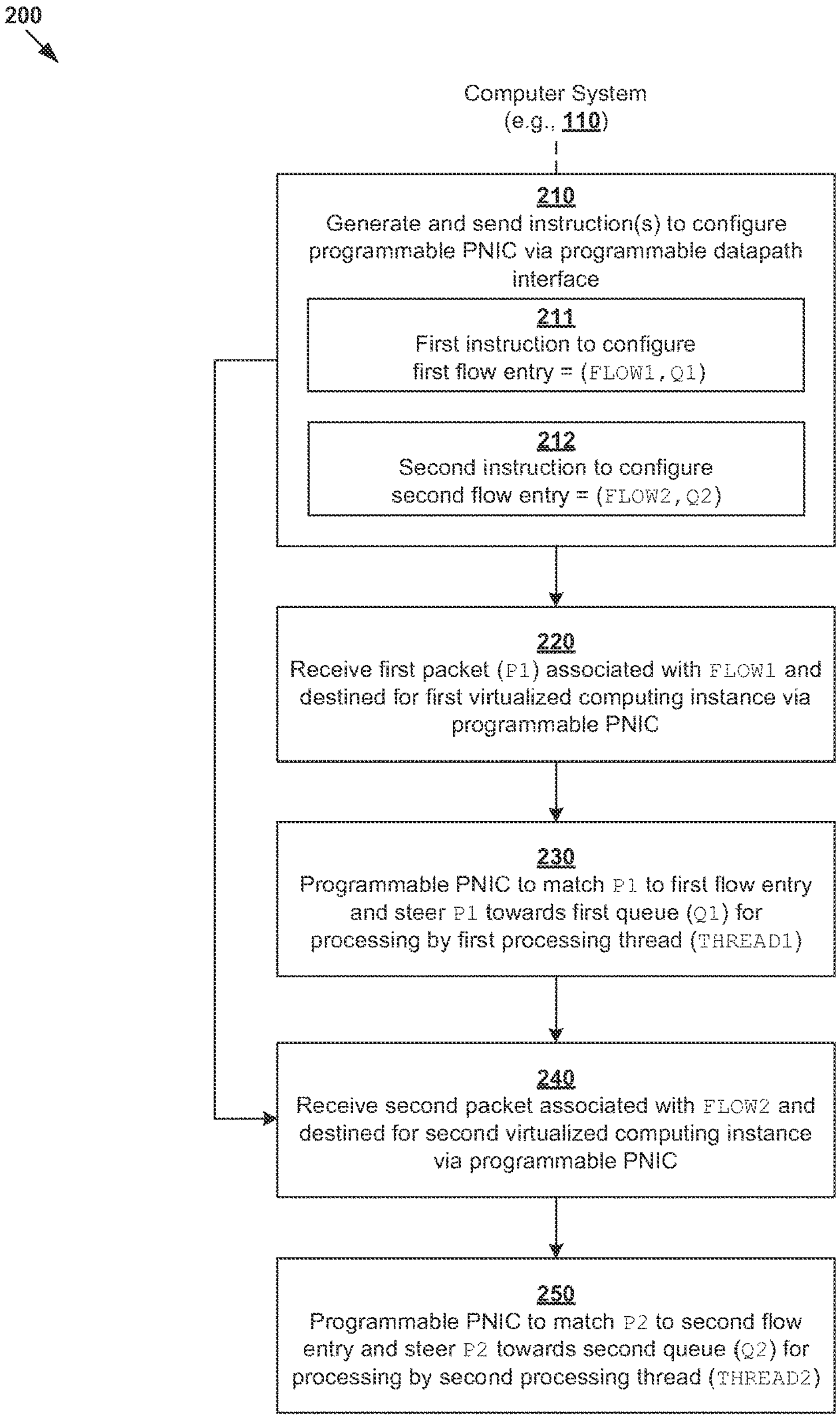
FIG. 2 is a flowchart of an example process for a computer system to perform RSS using a programmable physical network interface controller (PNIC)

At 210 in FIG. 2, host 110 (e.g., queue management layer 150) may generate and send instruction(s) to the programmable PNIC 170 to configure (a) a first flow entry that associates a first packet flow with a first queue and (b) a second flow entry that associates a second packet flow with a second queue. For example in FIG. 1, instruction(s) 181 may cause programmable PNIC 170 to configure first flow entry 182 to steer the first packet flow towards first queue=Q1 171, and second flow entry 183 to steer the second packet flow towards second queue=Q2 172.

At 220 in FIG. 2, host 110 may receive, via programmable PNIC 170, first packet(s) associated with the first packet flow and destined for VM1 121. At 230, programmable PNIC 170 may match the first packet(s) with first flow entry 182 and steer the first packet(s) towards first queue=Q11 171 for processing by first processing thread=THREAD1 161. See first packets (P1) associated with the first packet flow at 191-193 in FIG. 1. The first packets (P1) may originate from source=server A 101 (e.g., physical machine or VM) in FIG. 1.

At 240 in FIG. 2, host 110 may receive via programmable PNIC 170 second packet(s) associated with the second packet flow and destined for VM2 122 (see "P2" in FIG. 1). At 250, programmable PNIC 170 may match the second packet(s) with second flow entry 183 and steer the second packet(s) towards second queue=Q2 172 for processing by a second processing thread. See second packets (P2) associated with the second packet flow at 194-196 in FIG. 1. The second packets (P2) may originate from source=server B 102 (e.g., physical machine or VM) in FIG. 1.

As will be discussed further using FIGS. 4-6, block 210 may involve queue management layer 150 generating and sending the instruction(s) via programmable datapath interface 151 (also known as datapath programming interface). The instruction(s) may be generated and sent by invoking application programming interface (API) function(s) supported by programmable datapath interface 151 for flow entry configuration. Any suitable programming language may be used to configure programmable PNIC 170, such as P4 that is a domain-specific language for configuring how a programmable forwarding hardware processes packets, etc. Various examples will be discussed below using FIGS. 3-6.

Example Flow Entry Configuration

Figure 3:
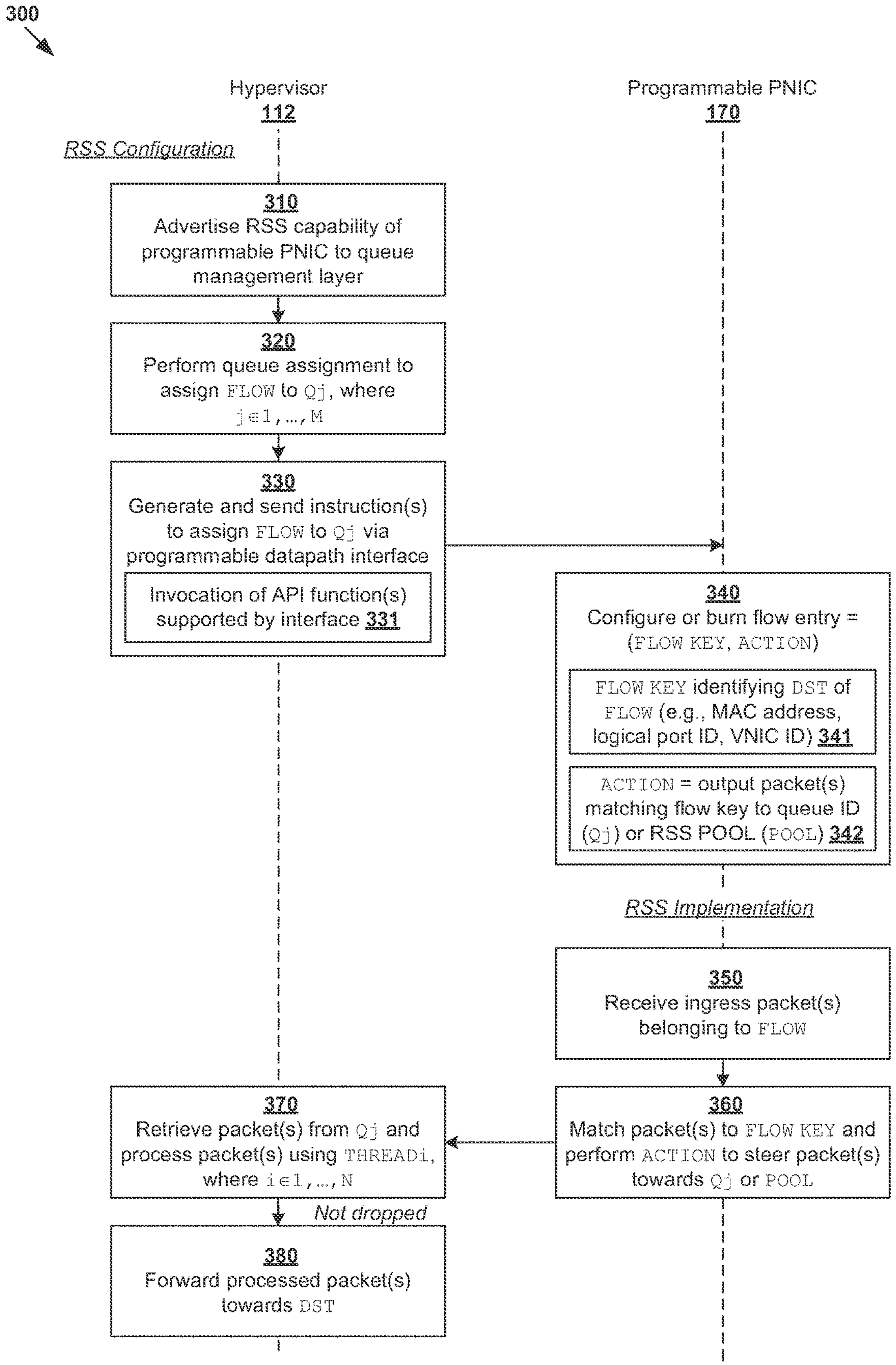
FIG. 3 is a flowchart of an example detailed process for a computer system to perform RSS using a programmable PNIC.

Example implementation details will be explained using FIGS. 3-4. In particular, FIG. 3 is a flowchart of example detailed process 300 for a computer system to perform RSS using programmable PNIC 170. Example process 300 may include one or more operations, functions, or actions illustrated by one or more blocks, such as 310 to 380. Depending on the desired implementation, various blocks may be combined into fewer blocks, divided into additional blocks, and/or eliminated. FIG. 4 is a schematic diagram illustrating first example 400 of a computer system performing RSS using programmable PNIC 170.

(a) Device Driver

Figure 4:
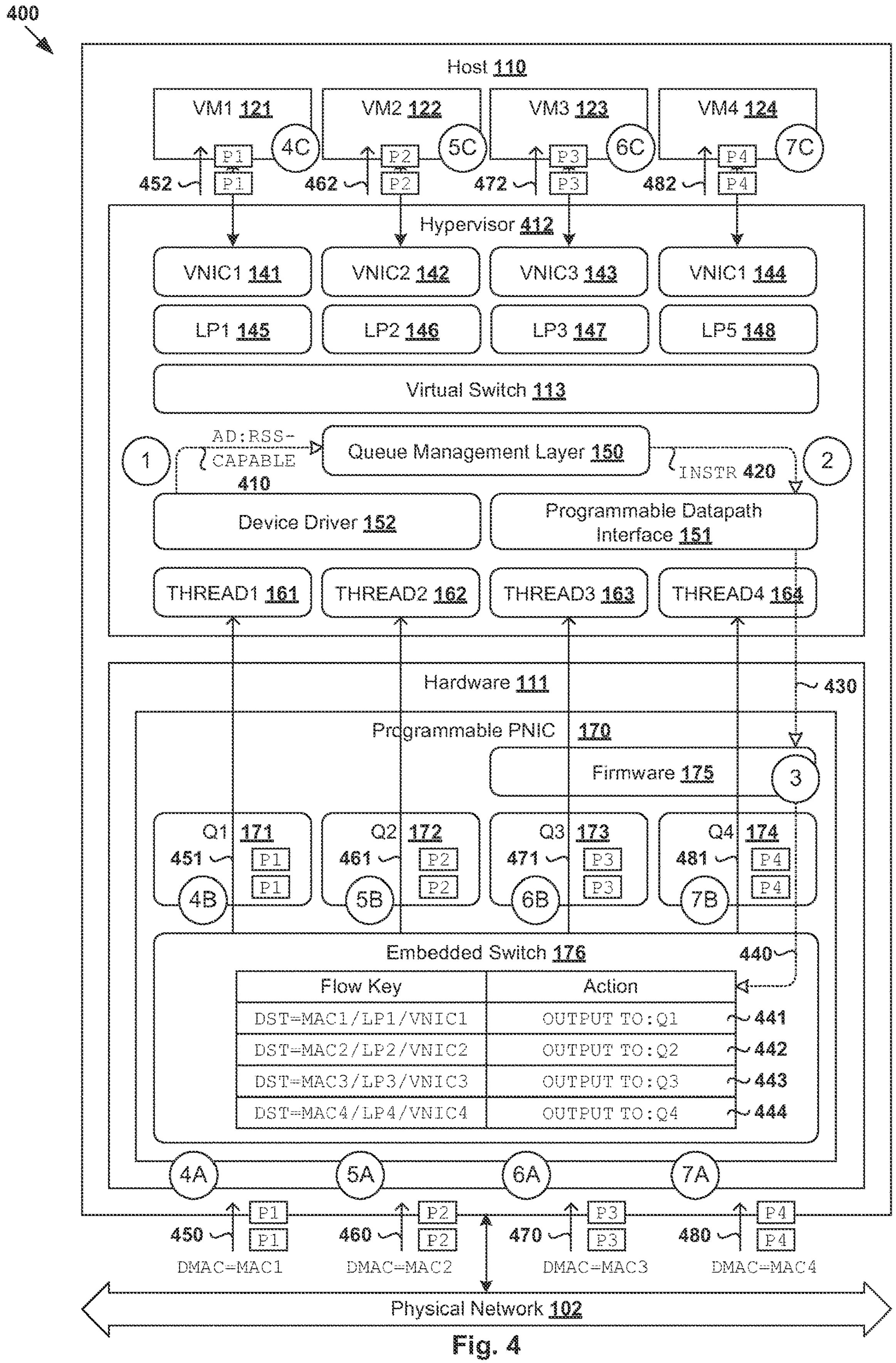
FIG. 4 is a schematic diagram illustrating a first example of a computer system performing RSS using a programmable PNIC.

At 410 in FIG. 4, device driver 152 on host 110 may generate and send an advertisement to queue management layer 150 to advertise the RSS capability of programmable PNIC 170. Depending on the desired implementation, device driver 152 may perform the RSS advertisement using any suitable API(s), such as VMKAPI(s) supported by vmkernel that runs on hypervisor 112 and is responsible for managing VMs 121-124 and underlying hardware. The advertisement may indicate whether programmable PNIC 170 supports NetQ or NetQ RSS, number of filters, etc. See also 310 in FIG. 3.

Depending on the desired implementation, device driver 152 may advertise the RSS capability as device RSS. This capability may be filtered at programming datapath interface 151 in software. Queue management layer 150 may be notified that device driver 152 is reporting NetQ RSS capability.

(b) Queue Management Layer

Based on advertisement 410, queue management layer 150 may simulate NetQ RSS over device RSS. As used herein, the term "queue management layer" may refer generally to software-implemented module(s) capable of assigning a packet flow to a queue, as well as generating and sending instruction(s) to configure programmable PNIC 170 to steer the packet flow to the assigned queue. At 420 in FIG. 4, queue management layer 150 may perform queue assignment by assigning a packet flow to one of multiple queues 171-174 and configure programmable PNIC 170 by generating and sending instruction(s) via programmable datapath interface 151. It should be noted that the instruction(s) from queue management layer 150 are sent to programmable datapath interface 151 instead of device driver 152. See also 320-331 in FIG. 3.

In practice, queue management layer 150 may notify an OS layer of hypervisor 112 to convert input(s) to API(s) supported by programmable datapath interface 151. Queue assignment may be triggered by a thread load balancer (not shown for simplicity) that is capable of applying any suitable policy to map a packet flow to one of processing threads 161-164 and corresponding queues 171-174. In a first example, a round robin policy may be implemented to assign THREAD1 161 and Q1 171 to a first packet flow, THREAD2 162 and Q2 172 to a second packet flow, and so on. In a second example, a hash-based policy may be implemented to generate a hash number based on flow information (e.g., destination MAC/port ID/VNIC ID) and map the hash number to a particular queue. In a third example, a metric-based policy may be implemented to assign a queue based on metric information (e.g., load, queue length, number of packets or bytes, etc.) associated with processing threads 161-164, etc. Four example packet flows are shown in FIG. 4.

A first packet flow (see "P1") destined for VM1 121 may be associated with destination information in the form of destination MAC address=MAC1, destination logical port=LP1 145 or destination VNIC=VNIC1 141. Queue management layer 150 may assign the first packet flow to first queue=Q1 171 by generating and sending a first instruction to programmable PNIC 170 via interface 151. The first instruction may be generated and sent to invoke an API function supported by interface 151. The first instruction may specify flow entry attributes that include destination information associated with VM1 121 and queue ID=Q1.

A second packet flow (see "P2") destined for VM2 122 may be associated with destination information in the form of destination MAC address=MAC2, destination logical port=LP2 146 or destination VNIC=VNIC2 142. Queue management layer 150 may assign the second packet flow to second queue=Q2 172 by generating and sending a second instruction to programmable PNIC 170 via interface 151. The second instruction may be to invoke an API function with flow entry attributes that include destination information associated with VM2 122 and queue ID=Q2.

A third packet flow (see "P3") destined for VM3 123 may be associated with destination information in the form of destination MAC address=MAC3, destination logical port=LP3 146 or destination VNIC=VNIC3 143. Queue management layer 150 may assign the third packet flow to third queue=Q3 173 by generating and sending a third instruction to programmable PNIC 170 via interface 151. The third instruction may be to invoke an API function based on flow entry attributes that include destination information associated with VM3 123 and queue ID=Q3.

A fourth packet flow (see "P4") destined for VM4 124 may be associated with destination information in the form of destination MAC address=MAC4, destination logical port=LP4 146 or destination VNIC=VNIC4 144. Queue management layer 150 may assign the fourth packet flow to fourth queue=Q4 174 by generating and sending a fourth instruction to programmable PNIC 170 via interface 151. The fourth instruction may be to invoke an API function based on flow entry attributes that include destination information associated with VM4 124 and queue ID=Q4.

(c) Programmable Datapath Interface

At 430 in FIG. 4, in response to receiving a particular instruction from queue management layer 150, programmable datapath interface 151 may configure a corresponding flow entry on programmable PNIC 170 by interacting with firmware 151 on programmable PNIC 170. In practice, programmable datapath interface 151 may be any suitable interface capable of interacting with programmable PNIC 170 to burn flow entries in hardware on programmable NIC 170. Implementation of interface 151 and API(s) supported by interface 151 may be vendor specific.

(c) Programmable PNIC

At 440 in FIG. 4, based on instruction(s) from queue management layer 150 via interface 151, hardware configuration may be performed to burn one or more flow entries on programmable PNIC 170. Here, "burning" flow entries into programmable PNIC 170 means to write the flow entries into firmware 175 to cause embedded switch 176 to perform packet handling based on the flow entries. The ability to control how programmable PNIC 170 performs RSS is useful for improving performance.

Each flow entry may represent a structure or match-action pipeline specifying (a) a flow key to be matched to a packet and (b) an action to be performed in the case of a match. Any suitable flow attribute(s) may be used as a flow key, such as destination MAC address, destination port ID (e.g., logical port ID), destination VNIC ID, etc. The action may specify a queue ID to store incoming packets that match with the flow key. See also 340-342 in FIG. 3 and example flow entries 441-444 in FIG. 4.

At 441 in FIG. 4, firmware 175 may configure a first flow entry specifying (a) first flow key information identifying destination=(MAC1, LP1 145, VNIC1 141) associated with VM1 121 and (b) action to output to queue ID=Q1 associated with Q1 171. At 450-451, in response to receiving ingress packet(s) matching the first flow key, embedded switch 176 may steer the packet(s) towards Q1 171 for processing by THREAD1 161. At 452, after processing by THREAD1 161 (and not dropped), the packet(s) may be forwarded towards destination VM1 121. See also 350-380 in FIG. 3.

At 442 in FIG. 4, a second flow entry may specify (a) second flow key information identifying destination=(MAC2, LP2 146, VNIC2 142) associated with VM2 122 and (b) action to steer packet(s) matching the flow key towards second queue=Q2 172. At 460-461, in response to receiving ingress packet(s) matching the second flow key, embedded switch 176 may steer the packet(s) towards Q2 172 for processing by THREAD2 162. At 462, after processing by THREAD2 162 (and not dropped), the packet(s) may be forwarded towards destination VM2 122.

At 443 in FIG. 4, a third flow entry may specify (a) third flow key information identifying destination=(MAC3, LP3 147, VNIC3 143) associated with VM3 123 and (b) action to steer packet(s) matching the flow key towards third queue=Q3 173. At 470-471, in response to receiving ingress packet(s) matching the third flow key, embedded switch 176 may steer the packet(s) towards Q3 173 for processing by THREAD3 163. At 472, after processing by THREAD3 163, the packet(s) may be forwarded towards destination VM3 123.

At 444, a fourth flow entry may specify (a) a fourth flow key identifying destination=(MAC4, LP4 148, VNIC4 144) associated with VM4 124 and (b) action to steer packet(s) towards fourth queue=Q4 174. At 480-481, in response to receiving ingress packet(s) matching the fourth flow key, embedded switch 176 may steer the packet(s) towards Q4 174 for processing by THREAD4 164. At 482, after processing by THREAD4 164, the packet(s) may be forwarded towards VM4 124.

Using examples of the present disclosure, multiple datapaths may be programmed on programmable PNIC 170 via interface 151 to provide a more granular control over RSS, particularly how different packet flows are steered towards different queues 171-174 and processing threads 161-164. For example, first flow entry 441 with action="Output to Q1" is to program a first datapath that includes Q11 171 on programmable PNIC 170. Second flow entry 442 with action="Output to Q2" is to program a second datapath that includes Q2 172 on programmable PNIC 170. Similarly, third flow entry 443 with action="Output to Q3" is to program a third datapath that includes Q3 173, and fourth flow entry 444 with action="Output to Q4" is to program a fourth datapath that includes Q4 174 on programmable PNIC 170.

Depending on the desired implementation, any suitable programming language may be used to program PNIC 170, such as P4, etc. P4 programs generally include two parts: control plane and data plane. The control plane is responsible for loading a P4 program into firmware 175 of programmable PNIC 170 and performing configuration, such as to burn flow entries 441-444, etc. The data plane is responsible for processing or forwarding packets according to flow entries 441-444. P4 programs may be written in a high-level language (e.g., C) before being compiled into a binary that may be loaded into programmable PNIC 170.

Although a one-to-one relationship between a queue (e.g., Q1 171) and a processing thread (e.g., THREAD1 161) is shown in FIG. 4, it should be understood that a one-to-many relationship may be used. For example, a single queue may be associated with multiple processing threads, or a single processing thread may be associated with multiple queues. In practice, each processing thread 161/162/163/164 may be configured to perform any suitable packet processing operations, such as header encapsulation or decapsulation, encryption or decryption, applying firewall rule(s), routing packet(s) towards destination, etc.

Host with RSS Pool(s)

Examples of the present disclosure may be implemented by host 110 that supports a pool of multiple queues (known as an "RSS pool"). In more detail, FIG. 5 is a schematic diagram illustrating second example 500 of a computer system performing RSS using programmable PNIC 170. In this example, Q3 173 and Q4 174 may be assigned to pool 501. The number of queues assigned to pool 501 may be scaled according to traffic requirements. Note that one or more pools may be configured. Implementation details explained using FIG. 4 are also applicable here and will not be repeated for brevity.

Figure 5:
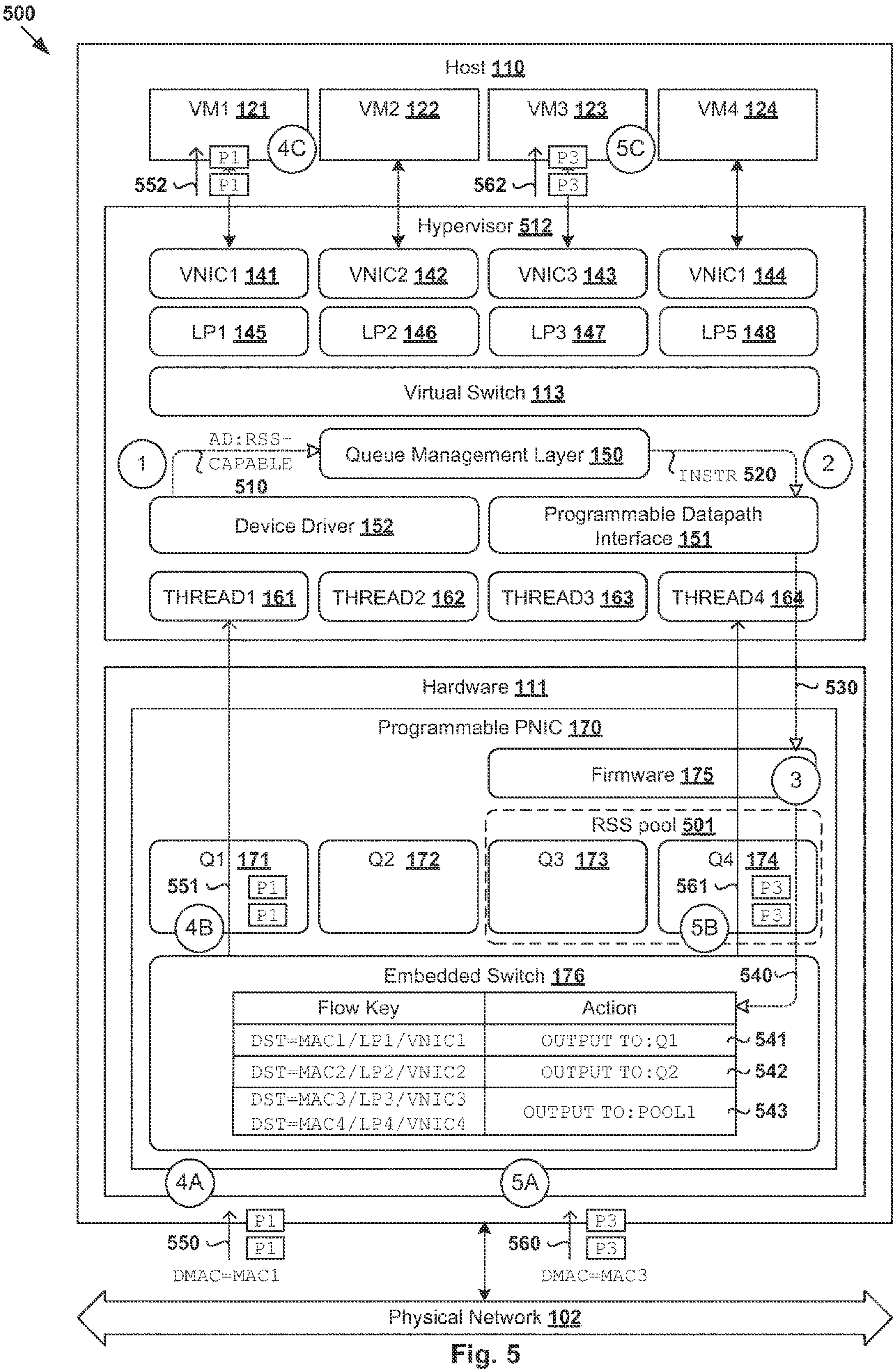
FIG. 5 is a schematic diagram illustrating a second example of a computer system performing RSS using a programmable PNIC.

At 510 in FIG. 5, device driver 152 may advertise the RSS capability of programmable PNIC 170 to queue management layer 150 responsible for queue management. At 520-530, queue management layer 150 may generate and send instruction(s) to programmable PNIC 170 via interface 151 to assign different packet flows to Q1 171, Q2 172 and POOL 501. For example, a first packet flow destined for VM1 121 is assigned to Q1 171 and a second packet flow destined for VM2 122 to Q2 171. A third packet flow destined for VM3 123 and a fourth packet flow destined for VM4 124 are assigned to POOL 501.

At 540 in FIG. 5, based on the instruction(s) received via interface 151, flow entries 541-544 may be burned or written into programmable PNIC 170. At 541, based on a first instruction, a first flow entry may be configured to specify (a) flow key=(MAC1, LP1 145, VNIC1 141) associated with VM1 121 and (b) action="Output to Q1" to steer matching packet(s) towards Q11 171. At 542, based on a second instruction, a second flow entry may specify (a) flow key=(MAC2, LP2 146, VNIC2 142) associated with VM2 122 and (b) action="Output to Q2" to steer matching packet(s) towards Q2 172.

At 543 in FIG. 5, based on a further instruction, a third flow entry may be configured to specify (a) flow key identifying (MAC3, LP3 147, VNIC3 143) associated with VM3 123 or (MAC4, LP4 148, VNIC4 144) associated with VM4 124 and (b) action="Output to POOL1" to steer matching packet(s) towards POOL 501. Note that "POOL1" is specified instead of a specific queue ID.

At 550-551 in FIG. 5, in response to receiving ingress packet(s) matching the first flow key (see 541) and destined for VM1 121, embedded switch 176 may steer the matching packet(s) towards Q1 171 for processing by THREAD1 161. At 552, after processing by THREAD1 161 (and not dropped), the packet(s) may be forwarded towards VM1 121.

At 560-561 in FIG. 5, in response to receiving ingress packet(s) matching the third flow key (see 543) and destined for VM4 124, embedded switch 176 may steer the matching packet(s) towards any member of POOL 501, such as Q4 174. At 562, after processing by THREAD4 164 associated with Q4 174 (and not dropped), the packet(s) may be forwarded towards VM4 124. In practice, POOL 501 may be adjusted by adding or removing queue(s) to adapt to real-time receive processing load.

NUMA Configuration

Examples of the present disclosure may be implemented by host 110 that is configured according to any suitable multi-processor architecture, such as non-uniform memory access (NUMA) architecture, etc. In general, NUMA systems are advanced system platforms with more than one system bus. NUMA systems may be implemented to harness a large number of processors in a single system image with superior price to performance ratios. For the past decade, processor clock speed has increased dramatically. A multi-gigahertz CPU, however, needs to be supplied with a large amount of memory bandwidth to use its processing power effectively. Even a single CPU running a memory-intensive workload (e.g., a scientific computing application) may be constrained by memory bandwidth. This problem generally is amplified on symmetric multiprocessing (SMP) systems, where many processors compete for bandwidth on the same system bus. Some high-end systems try to solve this by building a high-speed data bus, but this solution is expensive and limited in scalability.

NUMA is an alternative approach that links several smaller, more cost-effective nodes (called "NUMA nodes") using a high-performance NUMA connection. The term "NUMA node" may refer generally to a group of processor(s) and memory configured using any suitable NUMA-based architecture. An advanced memory controller allows a node to use memory on all other nodes, creating a single system image. When a processor accesses (remote) memory that does not lie within its own NUMA node, the data must be transferred over the NUMA connection, which is slower than accessing local memory. Memory access times are therefore "not uniform" and depend on the location of the memory and the node from which it is accessed.

An example will be explained using FIG. 6, which is a schematic diagram illustrating third example 600 of a computer system performing RSS using programmable PNIC 620. Note that implementation details explained using FIG. 4 are also applicable here and will not be repeated for brevity. In this example, host 110 includes multiple NUMA nodes, such as first NUMA node 610 ("NUMA1") and second NUMA node 620 ("NUMA2") that are interconnected via NUMA connection 615. Each NUMA node 610/620 may include multi-core CPU 611/621, memory controller 612/622, host physical memory 613/623, Input/Output (I/O) controller 614/624, etc. In practice, first CPU 611 (labelled "CPU1") may access its local memory 613 on the same on NUMA1 610 faster than remote memory 623 on different NUMA2 620. Second CPU 621 (labelled "CPU2") on NUMA2 620 may access its local memory 623 faster than remote memory 613 on NUMA1 610. The shared memory functionality is provided by via NUMA connection 615.

Depending on the desired implementation, host 110 (e.g., using an entity called NUMA scheduler) may assign each VM to a home node. For example in FIG. 6, VM1 121 and VM2 122 are assigned to NUMA1 610, while VM3 123 and VM4 124 are assigned to NUMA2 620. By assigning VM1 121 to NUMA1 610, virtual CPUs (not shown for simplicity) of VM1 121 are preferentially supported by first CPU 611 in NUMA1 610. Memory locality is also preferred, which means host 110 preferentially allocates guest physical memory (not shown for simplicity) to VM1 121 assigned to NUMA1 610 from host physical memory 613 on the same NUMA1 610.

Host 110 may include multiple PNICs, including first programmable PNIC 630 (labelled "PNIC1") associated with NUMA1 610 and second programmable PNIC 640 (labelled "PNIC2") associated with NUMA2 620. Each programmable PNIC 630/640 may include firmware 631/641, embedded switch 632/642 and multiple queues 633/643. Similar to the examples in FIGS. 1-5, queue management layer 150 may generate and send instruction(s) via interface 151 to configure PNIC 630/640 to implement RSS.

Figure 6:
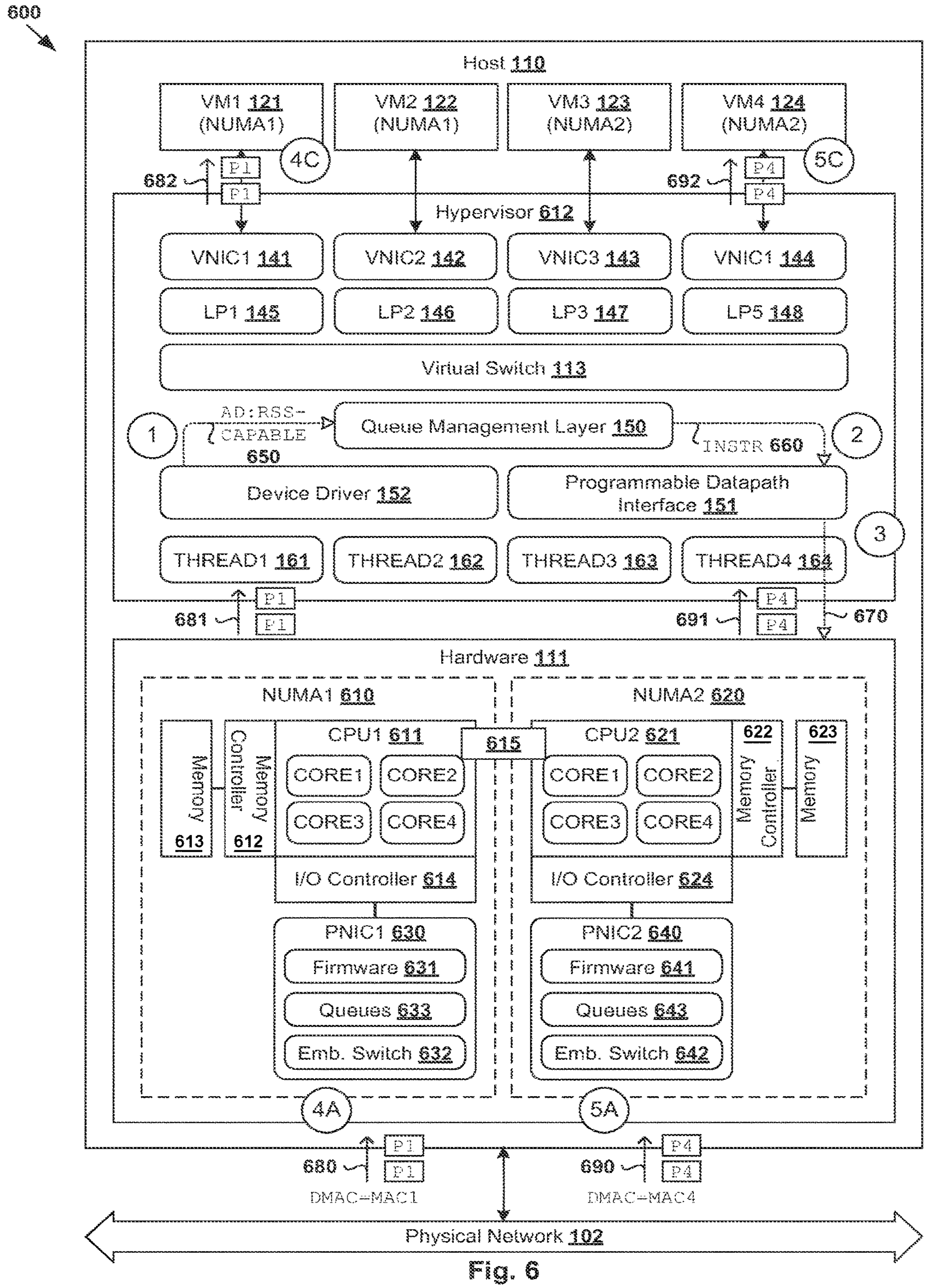
FIG. 6 is a schematic diagram illustrating a third example of a computer system performing RSS using a programmable PNIC.

At 650 in FIG. 6, device driver 162 may advertise the RSS capability of programmable PNIC 630/640 to queue management layer 150 responsible for queue management. At 660-670, queue management layer 150 may generate and send instruction(s) to programmable PNIC 630/640 via interface 151 to assign different packet flows to one of multiple hardware queues 633/643 on each PNIC 630/640. For example, queue assignment may be performed and corresponding flow entries configured based on NUMA affinity information identifying NUMA affinity of VM 121/122/123/124 and programmable PNIC 630/640.

Two example packet flows are shown in FIG. 6. In a first example, both VM1 121 and PNIC1 630 are configured with NUMA affinity with NUMA1 610. At 680 in FIG. 6, in response to receiving incoming packets destined for VM1 121, PNIC1 630 may match the packets to a first flow entry and steer the packets towards a first queue from multiple queues 633. At 681-682, after being processing by NUMA1 611 and THREAD1 161, the packets may be forwarded towards destination VM1 121.

In a second example, both VM4 124 and PNIC2 680 are configured with NUMA affinity with NUMA2 620. At 690 in FIG. 6, in response to receiving incoming packets destined for VM4 124 having affinity with NUMA2 620, PNIC2 680 may match the packets to a first flow entry and steer the packets towards a second queue. At 691-692, after being processing by NUMA2 620 and THREAD4 168, the packets may be forwarded towards destination VM4 124. Examples of the present disclosure should be contrasted against conventional approaches such as device RSS, which may lead to NUMA misalignment.

Container Implementation

Although discussed using VMs 121-124, it should be understood that examples of the present disclosure may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 121, where a different VNIC is configured for each container. Each container is "OS-less", meaning that it does not include any OS that could weigh 10*s* of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110 may be deployed in SDN environment 100 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system to perform receive side scaling (RSS), wherein the method comprises:

generating and sending one or more instructions to a programmable physical network interface controller (PNIC) of the computer system comprising firmware and an embedded switch to configure (a) a first flow entry that associates a first packet flow with a first queue and (b) a second flow entry that associates a second packet flow with a second queue, wherein the first flow entry and the second flow entry are written into the firmware to cause the embedded switch to perform packet handling based on the first flow entry and the second flow entry;

in response to receiving a first packet that is associated with the first packet flow and destined for a first virtualized computing instance supported by the computer system, the embedded switch of the programmable PNIC matching the first packet with the first flow entry and steering the first packet towards the first queue for processing by a first processing thread from multiple processing threads running on the computer system; and in response to receiving a second packet that is associated with the second packet flow and destined for a second virtualized computing instance supported by the computer system, the embedded switch of the programmable PNIC matching the second packet with the second flow entry and steering the second packet towards the second queue for processing by a second processing thread from the multiple processing threads.

2. The method of claim 1, wherein generating and sending the one or more instructions comprises:

generating and sending the one or more instructions to the programmable PNIC via a programmable datapath interface that is capable of interacting with the programmable PNIC and supports one or more application programming interface (API) functions for flow entry configuration.

3. The method of claim 2, wherein generating and sending the one or more instructions comprises:

generating and sending, by a queue management layer of the computer system, the one or more instructions to the programmable PNIC via the programmable datapath interface.

4. The method of claim 1, wherein generating and sending the one or more instructions comprises:

generating and sending the one or more instructions to burn the first flow entry and the second flow entry into the programmable PNIC, wherein (a) the first flow entry includes a first flow key specifying first destination information associated with the first packet flow and a first action to output matching first packets to the first queue, and (b) the second flow entry that includes a second flow key specifying second destination information associated with the second packet flow and a second action to output matching second packets to the second queue.

5. The method of claim 1, wherein the method further comprises:

prior to generating and sending the one or more instructions, receiving an advertisement from a device driver, wherein the advertisement indicates an RSS capability of the programmable PNIC.

6. The method of claim 1, wherein the method further comprises:

generating and sending a further instruction to the programmable PNIC to configure a third flow entry that associates a third packet flow with an RSS pool that includes multiple third queues; and in response to receiving a third packet that is associated with the third packet flow, the programmable PNIC matching the third packet with the third flow entry and steering the third packet towards one of the multiple third queues in the pool.

7. The method of claim 1, wherein generating and sending the one or more instructions comprises:

generating and sending the one or more instructions to the programmable PNIC to configure the first flow entry based on non-uniform memory access (NUMA) affinity information associated with the first virtualized computing instance and the programmable PNIC.

8. A non-transitory computer-readable storage medium that includes a set of instructions which, in response to execution by a processor of a computer system, cause the processor to perform receive side scaling (RSS), wherein the method comprises:

generating and sending one or more instructions to a programmable physical network interface controller (PNIC) of the computer system comprising firmware and an embedded switch to configure (a) a first flow entry that associates a first packet flow with a first queue and (b) a second flow entry that associates a second packet flow with a second queue, wherein the first flow entry and the second flow entry are written into the firmware to cause the embedded switch to perform packet handling based on the first flow entry and the second flow entry;

in response to receiving a first packet that is associated with the first packet flow and destined for a first virtualized computing instance supported by the computer system, the embedded switch of the programmable PNIC matching the first packet with the first flow entry and steering the first packet towards the first queue for processing by a first processing thread from multiple processing threads running on the computer system; and in response to receiving a second packet that is associated with the second packet flow and destined for a second virtualized computing instance supported by the computer system, the embedded switch of the programmable PNIC matching the second packet with the second flow entry and steering the second packet towards the second queue for processing by a second processing thread from the multiple processing threads.

9. The non-transitory computer-readable storage medium of claim 8, wherein generating and sending the one or more instructions comprises:

generating and sending the one or more instructions to the programmable PNIC via a programmable datapath interface that is capable of interacting with the programmable PNIC and supports one or more application programming interface (API) functions for flow entry configuration.

10. The non-transitory computer-readable storage medium of claim 9, wherein generating and sending the one or more instructions comprises:

generating and sending, by a queue management layer of the computer system, the one or more instructions to the programmable PNIC via the programmable datapath interface.

11. The non-transitory computer-readable storage medium of claim 8, wherein generating and sending the one or more instructions comprises:

generating and sending the one or more instructions to burn the first flow entry and the second flow entry into the programmable PNIC, wherein (a) the first flow entry includes a first flow key specifying first destination information associated with the first packet flow and a first action to output matching first packets to the first queue, and (b) the second flow entry that includes a second flow key specifying second destination information associated with the second packet flow and a second action to output matching second packets to the second queue.

12. The non-transitory computer-readable storage medium of claim 8, wherein the method further comprises:

prior to generating and sending the one or more instructions, receiving an advertisement from a device driver, wherein the advertisement indicates an RSS capability of the programmable PNIC.

13. The non-transitory computer-readable storage medium of claim 8, wherein the method further comprises:

generating and sending a further instruction to the programmable PNIC to configure a third flow entry that associates a third packet flow with an RSS pool that includes multiple third queues; and in response to receiving a third packet that is associated with the third packet flow, the programmable PNIC matching the third packet with the third flow entry and steering the third packet towards one of the multiple third queues in the pool.

14. The non-transitory computer-readable storage medium of claim 8, wherein generating and sending the one or more instructions comprises:

generating and sending the one or more instructions to the programmable PNIC to configure the first flow entry based on non-uniform memory access (NUMA) affinity information associated with the first virtualized computing instance and the programmable PNIC.

15. A computer system, comprising:

a queue management layer to generate and send one or more instructions to a programmable physical network interface controller (PNIC) comprising firmware and an embedded switch to configure (a) a first flow entry that associates a first packet flow with a first queue and (b) a second flow entry that associates a second packet flow with a second queue, wherein the first flow entry and the second flow entry are written into the firmware to cause the embedded switch to perform packet handling based on the first flow entry and the second flow entry; and the programmable PNIC to:

in response to receiving a first packet that is associated with the first packet flow and destined for a first virtualized computing instance supported by the computer system, match the first packet with the first flow entry and steer the first packet towards the first queue for processing by a first processing thread from multiple processing threads running on the computer system; and in response to receiving a second packet that is associated with the second packet flow and destined for a second virtualized computing instance supported by the computer system, match the second packet with the second flow entry and steer the second packet towards the second queue for processing by a second processing thread from the multiple processing threads.

16. The computer system of claim 15, wherein the queue management layer generating and sending the one or more instructions comprises:

generate and send the one or more instructions to the programmable PNIC via a programmable datapath interface that is capable of interacting with the programmable PNIC and supports one or more application programming interface (API) functions for flow entry configuration.

17. The computer system of claim 15, wherein the queue management layer generating and sending the one or more instructions comprises:

generating and sending the one or more instructions to burn the first flow entry and the second flow entry into the programmable PNIC, wherein (a) the first flow entry includes a first flow key specifying first destination information associated with the first packet flow and a first action to output matching first packets to the first queue, and (b) the second flow entry that includes a second flow key specifying second destination information associated with the second packet flow and a second action to output matching second packets to the second queue.

18. The computer system of claim 15, wherein the queue management layer is further to:

prior to generating and sending the one or more instructions, receive an advertisement from a device driver of the computer system, wherein the advertisement indicates an RSS capability of the programmable PNIC.

19. The computer system of claim 15, wherein:

the queue management layer is further to generate and send a further instruction to the programmable PNIC to configure a third flow entry that associates a third packet flow with an RSS pool that includes multiple third queues; and the programmable PNIC is further to, in response to receiving a third packet that is associated with the third packet flow, match the third packet with the third flow entry and steer the third packet towards one of the multiple third queues in the pool.

20. The computer system of claim 15, wherein the queue management layer generating and sending the one or more instructions comprises:

generating and sending the one or more instructions to the programmable PNIC to configure the first flow entry based on non-uniform memory access (NUMA) affinity information associated with the first virtualized computing instance and the programmable PNIC.

* * * * *